United States Patent
Giraud et al.

(10) Patent No.: US 7,681,724 B2
(45) Date of Patent: Mar. 23, 2010

(54) PRODUCT FOR EMBEDDING A PLURALITY OF PLUGS INTO A PLASTIC MULTI-COMPONENT HOUSING

(75) Inventors: Jean-Pierre Giraud, Paris (FR); Jacques Michel Marcel Pichot, Chennevière sur Marne (FR); Mathieu Paul Meugnier, Brètigny sur Orge (FR)

(73) Assignee: CSP Technologies, Inc., Amsterdam, NY (US)

( * ) Notice: Subject to any disclaimer, the term of this patent is extended or adjusted under 35 U.S.C. 154(b) by 294 days.

(21) Appl. No.: 11/619,572

(22) Filed: Jan. 3, 2007

(65) Prior Publication Data

US 2007/0163981 A1 Jul. 19, 2007

Related U.S. Application Data

(60) Provisional application No. 60/755,837, filed on Jan. 3, 2006.

(51) Int. Cl.
*B65D 81/26* (2006.01)
*F17C 11/00* (2006.01)

(52) U.S. Cl. .................................. 206/204; 206/538

(58) Field of Classification Search ................ 206/204, 206/528, 538, 438, 439, 535
See application file for complete search history.

(56) References Cited

U.S. PATENT DOCUMENTS

| 3,136,416 | A | * | 6/1964 | Goldrosen | 206/372 |
|---|---|---|---|---|---|
| 3,343,897 | A | * | 9/1967 | Keller | 312/31 |
| 4,717,018 | A | * | 1/1988 | Sacherer et al. | 206/305 |
| 4,898,273 | A | * | 2/1990 | Kristiansen | 206/204 |
| 4,935,274 | A | * | 6/1990 | DeBenedictis et al. | 428/36.7 |
| 5,037,285 | A | | 8/1991 | Kudert et al. | |
| 5,911,937 | A | * | 6/1999 | Hekal | 264/255 |
| 6,080,350 | A | * | 6/2000 | Hekal | 264/255 |
| 6,130,263 | A | * | 10/2000 | Hekal | 521/50 |
| 6,174,952 | B1 | * | 1/2001 | Hekal et al. | 524/503 |
| 6,214,255 | B1 | * | 4/2001 | Hekal | 252/194 |
| 6,571,942 | B2 | * | 6/2003 | Riemenschneider et al. | 206/204 |
| 6,595,365 | B1 | | 7/2003 | Wigmore | |
| 6,608,014 | B1 | | 8/2003 | Schramm, Jr. et al. | |
| 6,929,682 | B2 | | 8/2005 | Hurley et al. | |
| 7,213,720 | B2 | * | 5/2007 | Giraud | 220/839 |
| 2004/0089581 | A1 | * | 5/2004 | Dienst | 206/538 |

\* cited by examiner

*Primary Examiner*—Ehud Gartenberg
*Assistant Examiner*—Blaine G Neway
(74) *Attorney, Agent, or Firm*—Greenberg Traurig, LLP

(57) ABSTRACT

A multi-compartment housing with a plurality of cavities forms the main part of the housing. The multi-compartment housing has a side portion that has a smooth, continuous surface and a plurality of individual cavities that are perpendicular to a central axis of the multi-compartment housing. The individual cavities have a plurality of plugs capable of being placed in communication with a corresponding individual cavity. The multi-compartment housing also has a sealing bottom that is capable of being secured onto the multi-compartment housing after the plug array has been placed in position and separated from adjacent plugs from the array so as to close off the of the multi-compartment housing and to isolate each plug from adjacent cavities.

16 Claims, 3 Drawing Sheets

PRODUCT FOR EMBEDDING A PLURALITY OF PLUGS INTO A PLASTIC MULTI-COMPONENT HOUSING

CROSS-REFERENCE TO RELATED APPLICATIONS

This application claims priority to and the benefit of U.S. Provisional Application Ser. No. 60/755,837, filed Jan. 3, 2006, the entirety of which is incorporated herein by reference.

BACKGROUND OF THE INVENTION

Many medical diagnostic tests, pharmaceutical products, and unit dose over the counter (OTC) products are often individually packaged for consumer use or to be used in a dispensing device. Often, these products are moisture sensitive and require the use of a drying agent or desiccant to be incorporated into the package to protect the product. Both for economic reasons and user convenience, there is a desire to make these packages as compact as possible. A package that is an array of the product in a unit of use format is a preferred packaging format.

As the packages become more and more compact, the space available for the drying agent or desiccant is reduced. Typically small amounts of the drying agent or desiccant are needed, but handling these small quantities precisely becomes difficult as the space available gets reduced. Each compartment, with its corresponding drying agent or desiccant needs to be isolated from the others. One way to do this is to have an injection point for each piece of drying agent or desiccant material that is desired. As the size becomes smaller and the spacing closer together, having a separate injection point may not be practical—e.g. due to the physical space required for the injection point and the flow of material to the injection point.

SUMMARY OF THE INVENTION

In one embodiment, the present invention relates to a shaped housing with a plurality of cavities comprising: a multi-compartment housing that forms the main part of the housing, wherein the multi-compartment housing has a side portion that has a smooth, continuous surface and wherein the multi-compartment housing comprises a plurality of individual cavities that are perpendicular to a central axis of the multi-compartment housing and wherein the cavities have an open face in the multi-compartment housing that is on a radial line from the central axis so that a portion of an opening of each cavity is parallel to the central axis; a plug array comprising a plurality of plugs, wherein the plug array is sized so that each plug is capable of being placed in communication with a corresponding individual cavity of the multi-component housing and wherein the plurality of plugs are connected together; and a sealing bottom that is capable of being secured onto the bottom portion of the multi-compartment housing after the plug array has been placed in position so as to close off the bottom portion of the multi-compartment housing and to isolate each plug from adjacent cavities.

In yet another embodiment, the present invention relates to a method of forming a shaped housing with a plurality of cavities comprising the steps of: molding a multi-compartment housing that forms the main part of the housing, wherein the multi-compartment housing has a side portion that has a smooth, continuous surface and wherein the multi-compartment housing comprises a plurality of individual cavities that are perpendicular to a central axis of the multi-compartment housing and wherein the cavities have an open face in the multi-compartment housing that is on a radial from the central axis so that a portion of an opening of each cavity is parallel to the central axis; molding a plug array comprising a plurality of plugs, wherein the plug array is sized so that each plug is capable of being placed in communication with a corresponding individual cavity of the multi-component housing and wherein the plurality of plugs are connected together; inserting the plug array into the multi-component housing; and securing a plastic sealing bottom onto the bottom portion of the multi-compartment housing so as to close off the bottom portion of the multi-compartment housing and to isolate each plug from adjacent cavities.

BRIEF DESCRIPTION OF DRAWINGS

A more complete appreciation of the present invention and many of the attendant advantages thereof will be readily understood by reference to the following description was considered in connection with the accompanying drawings in which.

Figure 1:
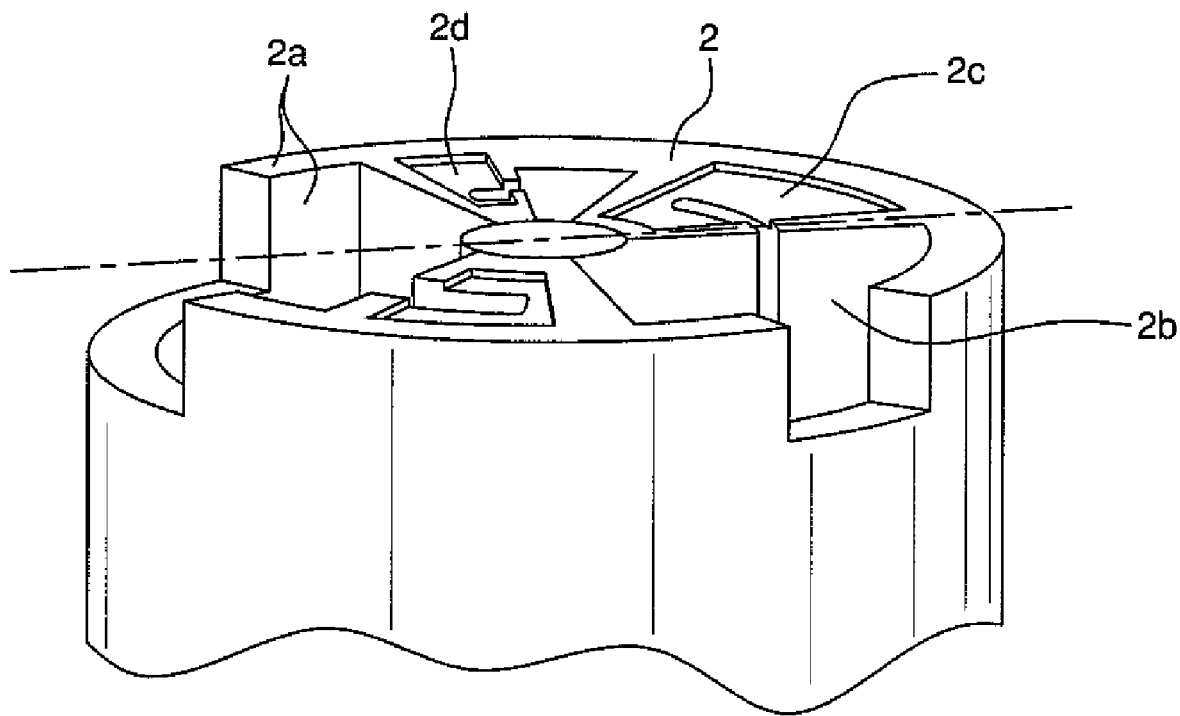
FIG. 1 is one embodiment of the present invention showing an overhead plane view of the multi-component housing.
Figure 2:
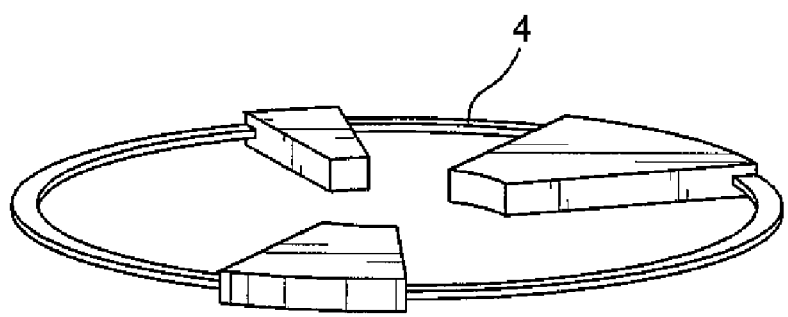
FIG. 2 is one embodiment of the present invention showing a plane view of the plug array.
Figure 3:
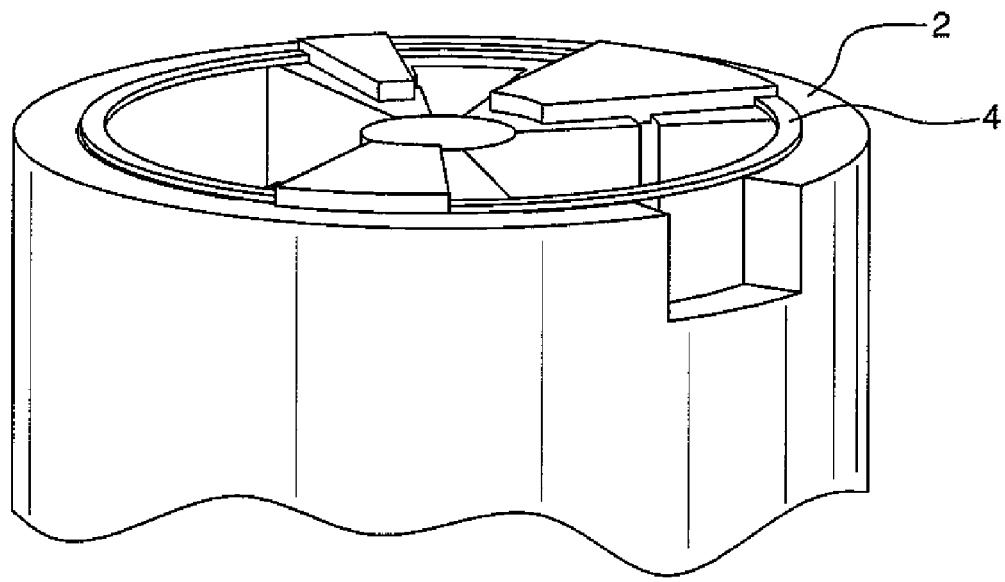
FIG. 3 is an overhead plan view of one embodiment of the plug array of FIG. 2 assembled on the multi-component housing of FIG. 1.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various embodiments and features thereof.

DETAILED EMBODIMENTS OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment, the present invention relates to a shaped housing with a plurality of cavities. In one example, the present invention is manufactured with individual pieces (e.g. plugs) of an active agent (e.g. drying agent or desiccant)

mixed with a plastic to form an active agent entrained plastic (e.g. desiccant entrained plastic). The desiccant entrained plastic pieces are in communication with one or more cavities of the housing. One example of the active agent entrained plastic is a three component composition and method that is disclosed in one or more of the following U.S. Pat. Nos. 5,911,937, 6,214,255, 6,130,263, 6,080,350 and 6,174,952, 6,124,006, and 6,221,446, incorporated by reference herein. Another example is a two component mixture of active agent and plastic.

In one embodiment, the process of making the present invention is manufactured in a multi-step injection molding process. For example, this process may incorporate 2-shot molding and include in mold assembly. In yet another embodiment, the shape of the housing of the present invention can be any desired shape. For example, the shaped housing can be cylindrical or substantially cylindrical. In another example, the shaped housing can be non-cylindrical (i.e., rectangular, square, oblong, oval). Individual pieces of active agent in communication with the cavities are incorporated in the desired shape of the housing.

In a further embodiment, as shown in FIGS. 1-4, the housing of the present invention may incorporate one or more of the following elements: a multi-compartment housing 2 that forms the main part of the housing. The multi-compartment housing 2 contains a plurality of individual cavities or compartments 2a-2d. The cavities or compartments are shaped such that a plug array 4 that incorporates the active agent can be placed in communication with the cavities or compartments. In yet another embodiment, the individual components of active agents of the plug array are connected together with a connecting runner.

Figure 4:
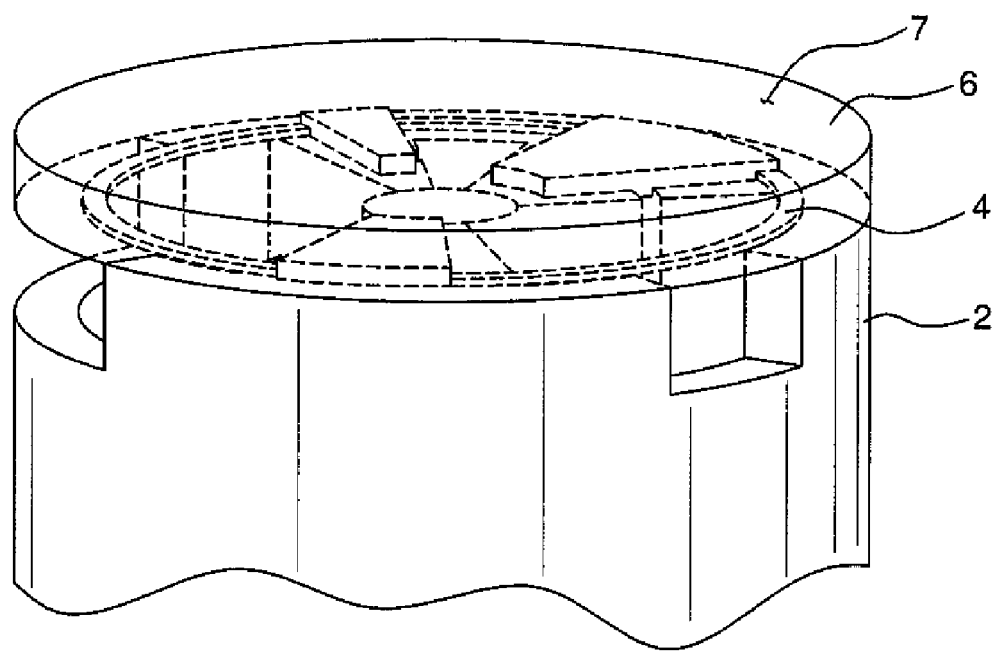
FIG. 4 is one embodiment of the present invention showing an overhead plane view of a plug array sealed to the multi-component housing.

In another embodiment, as shown in FIG. 4, a sealing bottom 6 is secured (e.g. molded) onto the multi-compartment housing 2 after the plug array 4 has been placed in position to close off one end of the multi-compartment housing. In one specific example, the process of molding the sealing bottom to the multi-compartment housing results in isolating the individual plugs (e.g. individual components of active agents) and in sealing the individual plugs from adjacent cavities—to substantially prevent the individual plugs from being in fluid communication with each other.

In yet another embodiment, the present invention relates to a product and method of making a plurality of compartments that are perpendicular to a central axis. The compartments have an open face that is on a radial from the central axis so that part of the opening is parallel to the central axis, i.e. on the side wall. In a further embodiment, since these openings are not formed by individual "side draws" or moving components of the mold. Because side draws are not used, a smooth, continuous surface results between compartments since there will be no tooling marks.

In yet another embodiment, the plug array is composed of any suitable thermoplastic resin. For example, the suitable plastic may be the same material as the multi-compartment housing. As such, in another embodiment, the plugs are used to create the enclosed compartment and are then sealed in when the sealing bottom is molded.

In one embodiment, the multi-compartment housing protects the product, for example an oral dose tablet or diagnostic test strip, and the active agent, which might be a desiccant, from the ambient environment. In another embodiment, the multi-compartment housing may also function in connection with other components in the overall product. The product is located in each cavity, which are connected with channels or an opening to the locations of the active agent, which is assembled during the manufacturing process.

Figure 5:
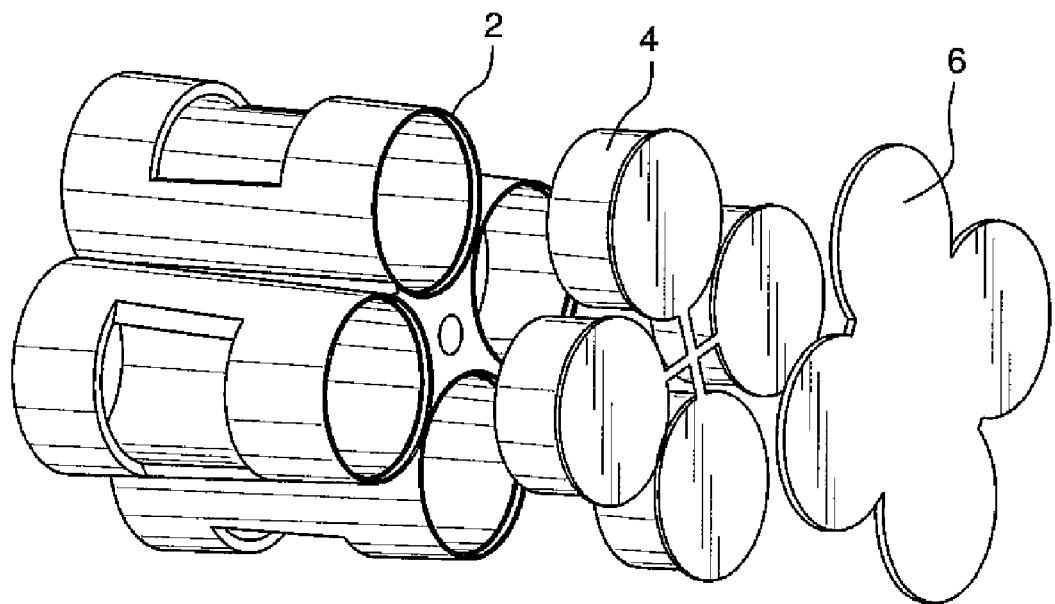
FIG. 5 is one embodiment of the present invention showing a bottom plane view of the assembly of the plug array being inserted into the multi-component housing with a sealing bottom.

In a further embodiment, as shown in FIG. 5, the multi-compartment housing 2 has a retaining feature, such as a well, for the individual plugs of the plug array 4 that holds them in position during manufacturing. In yet another embodiment, one end of the multi-compartment housing 2 may be sealed from the ambient environment with a removable or openable component, for example a heat sealable foil, so that the contents of the cavities can be accessed. The other end is sealed during the manufacturing of the housing.

In another embodiment, the plug array is composed of a plastic incorporating a variety of active agents depending on the requirements of the housing—such as 3 phase active-polymers. In another embodiment that includes one or more active agents, the active agents may be blended into polymers suitable for injection molding. For example, the amount of active agents in the polymer can range from about 30% to about 70% by weight of the polymer. The total capacity of the active agent can be customized by: (1) size of the plug and/or (2) varying the active agent loading in the polymer.

In one example, the active agents are blended into the polymer by using a compounding process. In a further example, an extruder (e.g., Leistriz Twin-Screw Extruder) can be used to compound the active polymer. In yet another example, the blended material is formed into strands and cut into regular shaped pellets suitable for use in an injection molding process.

Suitable types of active agents include, but are not limited to, desiccants—e.g. molecular sieves, silica gel, clays, calcium carbonate; oxygen absorbers; odor absorbers; and anti-microbial agents.

Figure 6:
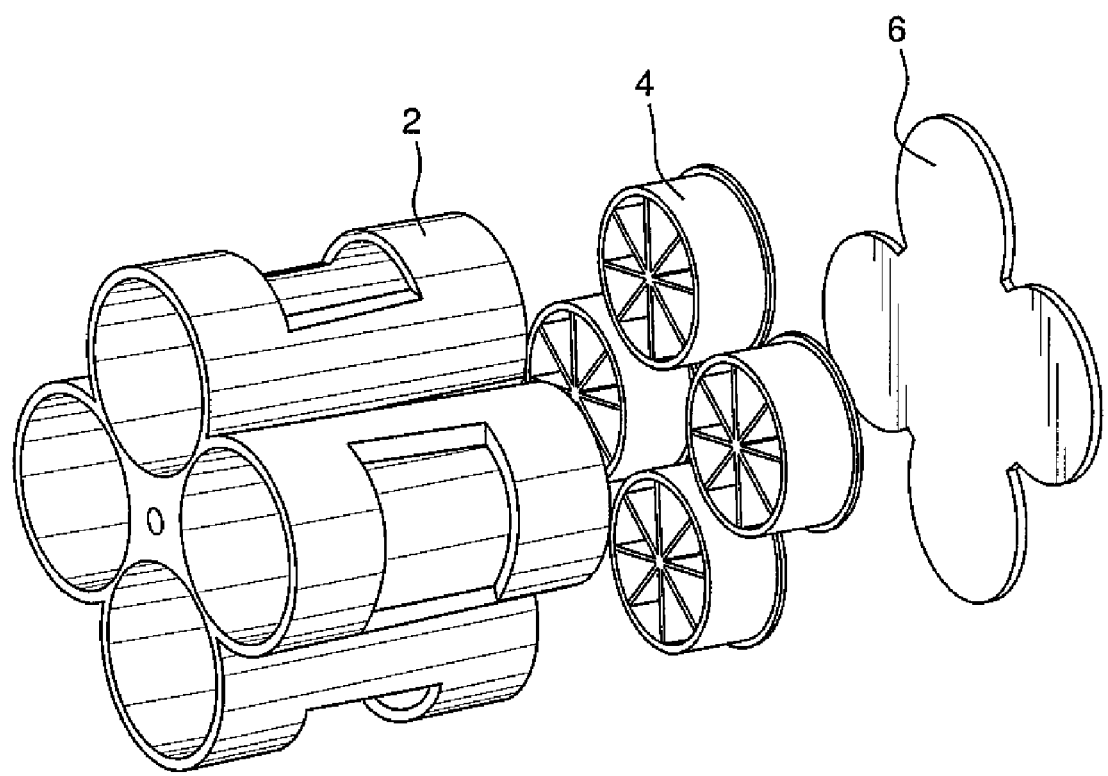
FIG. 6 is one embodiment of the present invention showing a top angled plane view of the assembly of the plug array being inserted into the multi-component housing with a sealing bottom.

In one embodiment, as shown in FIGS. 5 and 6, the plug array 4 consists of an array of a plurality of plugs. In one example, the individual plugs are capable of being precisely shaped by the mold and are held together in precise location by connecting runners. The connecting runner allows for a plurality of pieces to be formed from a single injection point, which facilitates close spacing of the plugs. In yet another embodiment, the plug array also permits a larger injection of material so that any variation in shot size is distributed over the plurality of pieces.

In another embodiment, a process that molds the plug array in the same mold as the multi-compartment housing may contain an undercut feature that is used on the outside bottom surface of the plug array so that it is removed from the internal core in the mold when opening. This may aid in the transfer to the multi-compartment housing. The undercuts are subsequently filled in when the Sealing Bottom is formed.

In yet another embodiment, as shown in FIGS. 5 and 6, the sealing bottom 6 is an injection molded component. Upon injection, the sealing bottom separates the individual plugs in the plug array from each other by breaking the connecting runner and mixing each individual plug into the material of the sealing bottom and therefore isolates the individual plugs. In a further embodiment, in addition to sealing off the active plugs from the ambient environment and adjacent cavities, the sealing bottom can also be a functional part of the overall housing design.

The multi-compartment housing and sealing bottom can be made of a variety of polymers depending on the specific requirements of the housing including barrier and non-barrier materials. Suitable materials include, but are not limited to, barrier plastics that may include, for example, polypropylene and polyethylene. Suitable non-barrier thermoplastic materials may include, but are not limited to, polystyrene and polycarbonate.

In one embodiment, the individual plugs contained in the plug array are supported during the injection of the Sealing Bottom. Suitable designs for support include, but are not limited to, by the design of the plug—for example a shoulder, or by the design of the mold during the molding process.

In a further embodiment, the present invention relates to a multi-compartment housing comprising at least three components, wherein the first component is injection molded, composed of a desired shape and comprises at least a wall, internal cavities open on two perpendicular faces, a sealable open end and a bottom closed end, wherein the second component is a plug array that is positioned at the open end of the multi-compartment housing. The plug array is in communication with the internal cavities of the first component. The plug array is formed as a plurality of connected plugs and assembled into position as an array and isolated into each cavity. The third component is a formed bottom that seals the open end of the multi-compartment housing so as to isolate and enclose the plugs.

Other embodiments include, but are not limited to: a) the housing composed of a desired shape such as cylindrical or non-cylindrical shape; b) the plug array made of a plurality of active agent plastic plugs; c) the plug array is supported during the molding of the sealing bottom; d) the plugs and/or bottom are injection molded; e) the plugs are isolated by the material flow during the injection of the formed bottom; f) the plugs are isolated by mechanical action during the assembly process; and g) the housing is open at both ends where one open end is closed with the plug and sealing bottom and the second open end is closed at a later time, for example after being filled with product The present invention may have one or more of the following advantages: ability to make the compartments with the opening on the side, parallel to the central axis; improved product stability during shelf life and use life; embeds the desiccant (drying agent) into the housing; the desiccant is not readily visible to the end user; eliminates loose desiccant in the package; the desiccant can not be easily removed; reduces the possibility of the desiccant being ingested; and the desiccant can be used to remove residual moisture in the product—the package can eliminate a process step.

The following illustrates an example of the present invention. It is understood that this is merely one example and is not meant to limit the invention to this illustration. This example uses a 2-shot injection molding with a 3-position rotary table. One mold cavity makes the multi-compartment housing, which may incorporate an active agent in the polymer. The second mold cavity forms the plug array. Polymers used for the multi compartment housing include, but are not limited to: (1) HDPE and (2) Polypropylene. The following is a sequence of operation of the manufacturing process:

The mold closes in Position 1:

Step 1a—multi-compartment housing cavity A: The mold injects polyethylene resin to form the exterior sidewalls and cavities of the multi-compartment housing. The exterior base of the housing is not formed at this time.

Step 1b—Plug Array Cavity B: Simultaneously with Step 1a, the mold injects a second polymer material into a separate mold cavity to form the plug array.

Step 2. The mold opens. The multi-compartment housing is retained in Cavity A. The plug array is retained on the core of Cavity B.

Step 3. The core side of the mold rotates 90 degrees to Position 2, so that the Cavity B core (that retains the plug array) is positioned over Cavity A (that contains the multi-compartment housing w/o base).

Step 4. The mold closes in Position 2; the plug array is mechanically transferred to the multi-compartment housing, the plug being retained by the retaining feature.

Step 5. The mold opens.

Step 6. The core side of the mold rotates 90 degrees to Position 3.

Step 7. The mold closes in Position 3 and the polyethylene resin is injected into the mold forming a sealing bottom on the multi-compartment housing. During the injection process, the connecting runners are broken away from the plugs and mixed into the resin, but do not create a homogenous mixture. The plugs are isolated from each other during this step.

Step 8. The mold opens.

Step 9. The finished part is ejected from the mold; the core side of the mold and rotates 180degrees back to Position 1.

The following illustrates another example of the present invention. It is understood that this is merely one example and is not meant to limit the invention to this illustration. This example uses a 2-position stack mold. The housing is made by a series of steps. One embodiment is to conduct these steps using a stack mold and a two shot molding machine. The series of steps are as follows—

Step 1—In the first position the polyethylene resin is injected into Cavity A making the multi-compartment housing. Simultaneously desiccant plastic is injected into Cavity B and the plug array is molded on the opposite side of the stack mold.

Step 2—the mold opens and the plug array is transferred into position on the other side of the mold. Also during this step the mold rotates to the second position.

Step 3—The plug array is inserted into the multi-compartment housing and is retained in position Step 4—The mold closes and the second injection of polyethylene occurs. The second injection creates the sealing bottom, breaking the plugs away from the connecting runners isolating the plugs and absorbs the material and bonds to the multi-compartment housing creating a substantially moisture tight seal, and locking the plugs in place in the housing. During the second injection of the first part, the first injection of the next housing is occurring, so that each cycle produces as completed part.

Step 5—The completed housing is ejected from the mold.

The following illustrates yet another example of the present invention. It is understood that this is merely one example and is not meant to limit the invention to this illustration. This example describes one method and sequence of steps to manufacture the housing. The housing could be manufactured by variations on these steps such as the following.

The mold closes in Position 1:

Step 1a—multi-compartment housing Cavity A: The mold injects polyethylene resin to form the exterior sidewalls and cavities of the multi-compartment housing. The exterior base of the housing is not formed at this time.

Step 1b—plug array Cavity B: Simultaneously with Step 1a, the mold injects a second polymer material into a separate mold cavity to form the Plug Array.

Step 2. The mold opens. The multi-compartment housing is retained in Cavity A. The plug array is retained on the core of Cavity B.

Step 3. The core side of the mold shuttles linearly to Position 2, so that the Cavity B core (that retains the Plug Array) is positioned over Cavity A (that contains the multi-compartment housing w/o base).

Step 4. The mold closes in Position 2; the plug array is mechanically transferred to the multi-compartment housing, the plug being retained by the retaining feature. The individual plugs are mechanically separated from the array.

Step 5. The mold opens. The shuttle returns.

Step 6. The multi-compartment housing with the plug array is moved to a Nest position in the mold.

Step 7. The mold closes and the polyethylene resin is injected into the mold forming a sealing bottom on the multi-compartment housing.

Step 8. The mold opens and the finished pat is ejected or removed from the mold.

The following illustrates yet another example of the present invention. It is understood that this is merely one example and is not meant to limit the invention to this illustration. This example describes one method and sequence of steps to manufacture the housing. The housing could be manufactured by variations on these steps such as the following.

In Step 1, the Plug Array and the multi-compartment housing do not need to be injected simultaneously on the same injection molding machine. For example, two machines working in tandem where the multi-compartment housing and sealing bottom are made on one machine, and the plug array is made on a second machine and transferred to the first machine for insertion in step 3.

A further variation would be to have each step carried out on a separate machine and transferring parts from one to another in the correct sequence.

A further variation would be to manufacture the plug array in advance and have it inserted into the mold.

A further variation is to manufacture the plug array by means other than injection molding, such as extrusion, casting or machining.

Further examples include one or more of the following: desired shape is cylindrical or non-cylindrical shape; plug array that is make of desiccant plastic; plug array and/or sealing bottom are injection molded; plug array that is make of oxygen scavenging plastic; plug array that is incorporates an anti-microbial agent in the plastic; plug array is manufactured by casting, extrusion, or machining.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A shaped housing, comprising:
    a multi-compartment housing that forms the main part of the housing, wherein the multi-compartment housing comprises a first end and a second end, wherein the multi-compartment housing comprises a side portion that extends between the first end and the second end of the multi-compartment housing, wherein the multi-compartment housing comprises a plurality of individual cavities that are disposed inside of the multi-compartment housing such that each of the cavities extends between the first end and the second end of the multi-compartment housing and such that each of the cavities opens to the outside of the multi-compartment housing through at least the first end of the multi-compartment housing, wherein the multi-compartment housing comprises a plurality of openings in the side portion, wherein each of the openings in the side portion connects with one of the cavities disposed inside of the multi-compartment housing such that each of the cavities opens to the outside of the multi-compartment housing through a respective one of the openings in the side portion, and wherein each of the openings is located in the side portion at a location between the first end and the second end of the multi-compartment housing without reaching the second end of the multi-compartment housing;
    a plug array comprising a plurality of plugs, wherein the plug array is sized so that each plug is in communication with a corresponding individual cavity of the multi-component housing at the first end of the multi-compartment housing; and
    a sealing bottom that is secured onto the first end of the multi-compartment housing with the plug array placed in position;
    wherein, with the sealing bottom secured to the first end of the multi-compartment housing, each of the openings in the side portion is bounded by the side portion and the sealing bottom.

2. The shaped housing of claim 1 wherein the plug is composed of an active agent.

3. The shaped housing of claim 1 wherein the plugs of the plug array are connected together when made.

4. The shaped housing of claim 1 wherein the plugs of the plug array are made individually.

5. The shaped housing of claim 2 wherein the plug is composed of an active agent entrained in a plastic composition.

6. The shaped housing of claim 5 wherein the active agent is a desiccant and is selected from the group of desiccants consisting of molecular sieve, silica gel, clay, and calcium carbonate.

7. The shaped housing of claim 5 wherein the active agent is selected from the group consisting of oxygen absorbers, odor absorbers, and anti-microbial agents.

8. The shaped housing of claim 1 wherein the shaped housing is one of cylindrical or substantially cylindrical.

9. The shaped housing of claim 1 wherein the shaped housing is non-cylindrical.

10. The shaped housing of claim 1 wherein the plurality of plugs are connected together with a connecting runner.

11. The shaped housing of claim 1 wherein the multi-compartment housing has a retaining element so as hold the individual plugs of the plug array in position during assembling.

12. The shaped housing of claim 1 wherein the second end of the multi-compartment housing is sealed with a removable component.

13. The shaped housing of claim 1 wherein the sealing bottom separates adjacent plugs from the array so as to close off the multi-compartment housing and so as to isolate each plug from adjacent cavities.

14. The shaped housing of claim 1 wherein the side portion has a smooth, continuous surface which is interrupted by essentially only the openings therein.

15. The shaped housing of claim 1 wherein each opening is sized to expose less than the entire space of each cavity to which each opening connects.

16. The shaped housing of claim 1 wherein the second end of the multi-compartment housing is a closed end.

* * * * *